US 6,570,586 B1

(12) United States Patent
Kamen et al.

(10) Patent No.: US 6,570,586 B1
(45) Date of Patent: May 27, 2003

(54) BANDWIDTH EFFECTIVE METHOD FOR COMMUNICATING INTERACTIVE LINKS

(75) Inventors: Yakov Kamen, Cupertino, CA (US); Leon A. Shirman, Redwood City, CA (US)

(73) Assignee: ISURFTV, Sunnyvale, CA (US)

( * ) Notice: Subject to any disclaimer, the term of this patent is extended or adjusted under 35 U.S.C. 154(b) by 0 days.

(21) Appl. No.: 09/390,047

(22) Filed: Sep. 3, 1999

(51) Int. Cl.[7] ............................. G09G 5/00; G06T 1/00
(52) U.S. Cl. ........................................ 345/719; 345/473
(58) Field of Search ................................ 345/716–720, 345/764, 781, 835, 839, 854, 610, 473–475; 725/37, 51, 52, 112, 113; 707/500.1, 501.1

(56) References Cited

U.S. PATENT DOCUMENTS

| | | | |
|---|---|---|---|
| 5,237,648 A | 8/1993 | Mills et al. | 345/723 |
| 5,539,871 A * | 7/1996 | Gibson | 707/501.1 |
| 5,675,752 A | 10/1997 | Scott et al. | 345/866 |
| 5,708,845 A * | 1/1998 | Wistendahl et al. | 707/500.1 |
| 5,732,184 A | 3/1998 | Chao et al. | 386/55 |
| 5,884,056 A | 3/1999 | Steele | 345/738 |
| 5,929,849 A | 7/1999 | Kikinis | 725/113 |
| 5,930,379 A | 7/1999 | Rehg et al. | 382/107 |
| 5,969,755 A | 10/1999 | Courtney | 348/143 |
| 5,970,504 A * | 10/1999 | Abe et al. | 707/501.1 |
| 5,987,509 A * | 11/1999 | Portuesi | 725/113 |
| 5,999,173 A | 12/1999 | Ubillos | 345/724 |
| 6,006,241 A | 12/1999 | Purnaveja et al. | 707/512 |
| 6,026,179 A | 2/2000 | Brett | 382/162 |
| 6,032,156 A | 2/2000 | Marcus | 707/104.1 |
| 6,175,840 B1 * | 1/2001 | Chen et al. | 707/501.1 |
| 6,205,485 B1 | 3/2001 | Kikinis | 709/231 |
| 6,229,524 B1 * | 5/2001 | Chernock et al. | 345/157 |
| 6,278,466 B1 * | 8/2001 | Chen | 345/473 |
| 6,298,482 B1 | 10/2001 | Seidman et al. | 725/101 |
| 6,317,141 B1 | 11/2001 | Pavley et al. | 345/732 |
| 6,462,754 B1 | 10/2002 | Chakraborty et al. | 345/723 |
| 2002/0036640 A1 * | 3/2002 | Akiyoshi et al. | 345/475 |

FOREIGN PATENT DOCUMENTS

EP     0788063 A2    8/1997

OTHER PUBLICATIONS

Patent application Ser. No. 08/825,209, entitled "Simulcast Web Page Delivery", filed Mar. 27, 1997.
Ma et al., "Video–Based Hypermedia for Education–on–Demand", IEEE, pp. 72–83, 1998.
Flammia, "Almost There: A New Medium on the Web", MIT, pp. 85–86, 1996.

* cited by examiner

*Primary Examiner*—Crescelle N. dela Torre

(57) ABSTRACT

A video signal transmission system transmits a video signal and data corresponding to the location and size of active areas for some of the frames of the video signal (but not other frames of the video signal). A video reception and display system determines the location and size for the active areas based on an interpolation technique. A viewer can click on the active areas to thereby link the receiving system to a web page or other information source.

31 Claims, 2 Drawing Sheets

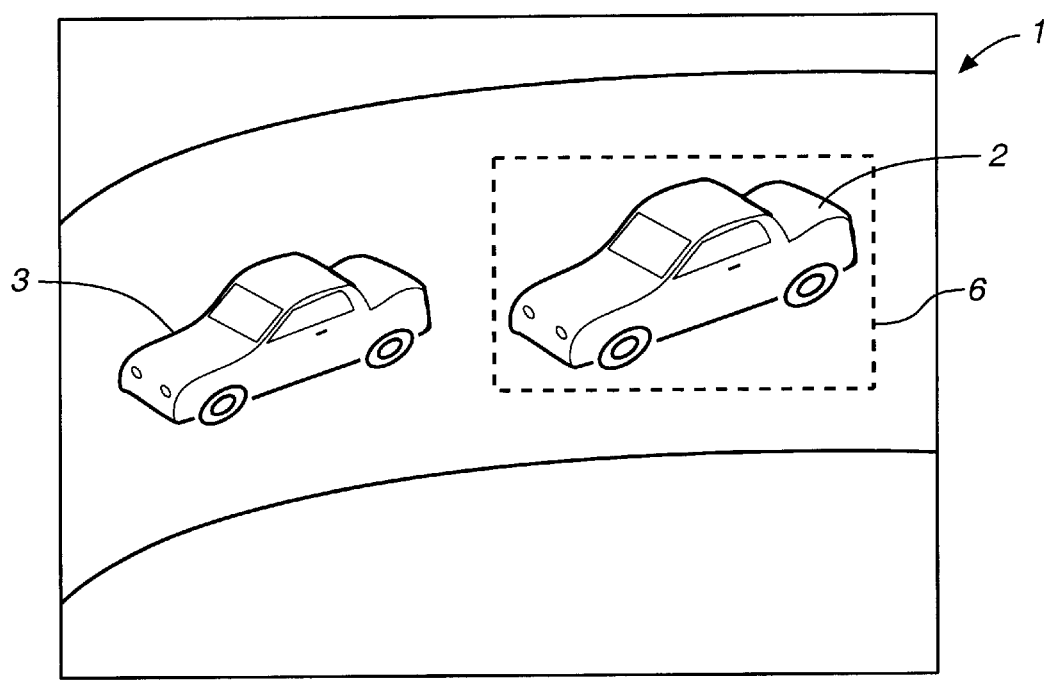
FIG._1
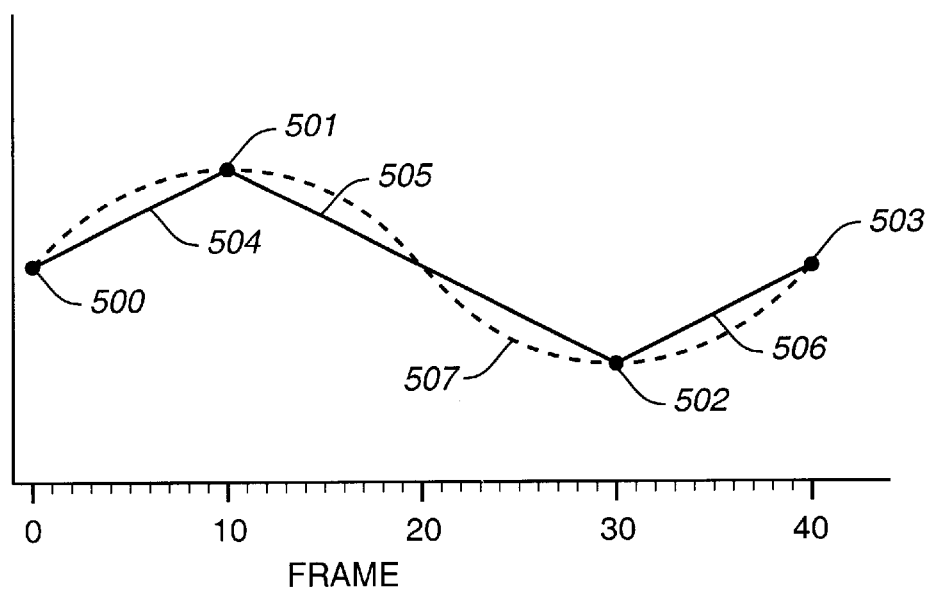
FIG._3

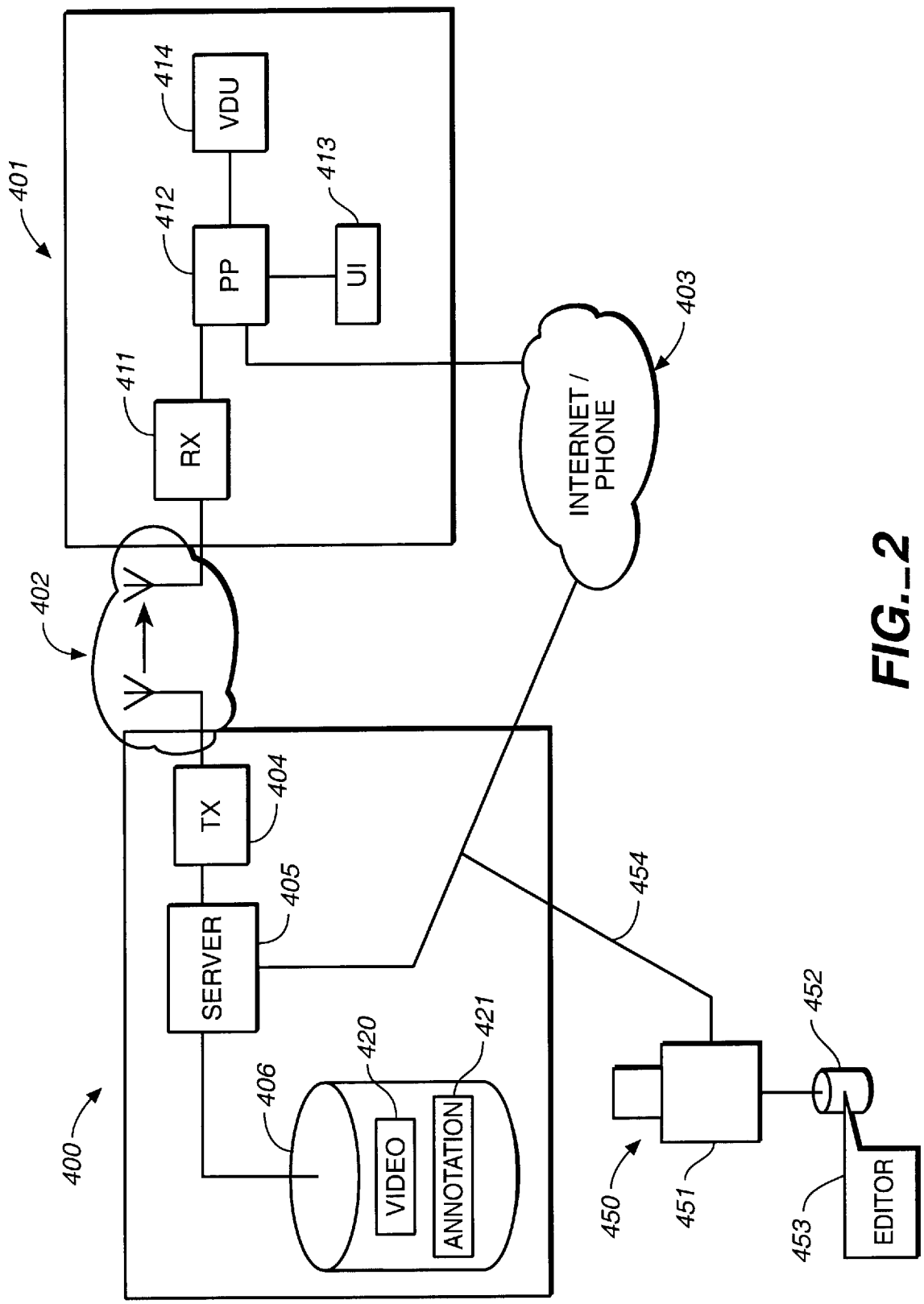
FIG._2

BANDWIDTH EFFECTIVE METHOD FOR COMMUNICATING INTERACTIVE LINKS

This application is related to our U.S. patent application entitled "Method and Apparatus for Interactive Marking of Dynamically Moving Objects in Video Streams and Animated Sequences", filed on the same day as the present application and incorporated herein by reference, Ser. No. 09/390,044.

This application is also related to our U.S. patent application entitled "Method and Apparatus for Recognition of Optimal Intermediate Key Frame for Object Tracking in Video Streams and Animated Sequences", filed on the same day as the present application and incorporated herein by reference, Ser. No. 09/389,916.

BACKGROUND OF THE INVENTION

This invention pertains to video programs containing interactive links.

It is known in the art to provide video. information containing interactive links; The video information can be in the form of a video movie, television program, or other type of video clip. Embedded within the video is one or more. interactive links. This means that during the video, a user can move a cursor over an object of interest and click on that object, e.g. using a mouse, touch pad, track ball, or other type of device. This activates a link, e.g. to a web page, a piece of software, or other source of information. The way this might work is as follows. Suppose a viewer is watching a video clip of an auto race on a television screen 1, and there are several automobiles 2, 3 visible on screen 1. Suppose the viewer desires further information concerning the driver of one of the automobiles (e.g. automobile 2). He might click on automobile 2 and activate a web page. link that will cause his television to display a web page providing information concerning the car and driver.

In order for such a system to function, the viewer's television system must receive a video signal corresponding to the program he is watching. The viewer's television system must also receive data identifying the source of information if the viewer clicks on a particular object displayed on the screen. For example, if the link is to a web site page, the viewer's television system must receive the URL (or other addressing means) for identifying which web page should be displayed if the viewer clicks on that object.

The viewer's television system must also receive data corresponding to the location of the "active area" on the television screen. The active area is that portion of the area of the television screen that the viewer will click on in order to access the desired link. Thus, in the case of the automobile race, the active area corresponding to a particular automobile in the race should be a portion of the screen area where the automobile is shown, e.g. as identified by dotted lines 6. (The position the active area may or may not be visually indicated on television screen 1.)

There are several ways for the television system to determine where active area 6 should be. One way is to design the television system such that it has pattern recognition capabilities, and can recognize where automobile 2 is located. Unfortunately, this would make television 1 quite expensive. Alternatively, for each frame of the video, one could communicate to the television system where active area 6 is to be located. Unfortunately, this would require a considerable amount of bandwidth, since the size and location for each active area on the screen would have to be communicated to the television system. This would have to be done for each frame of the video. (During the automobile race, automobiles 2 and 3 move about screen 1. Thus, the location and size of the active areas associated with automobiles 2 and 3 must be constantly updated.) Also, there could be many active areas on the screen, each corresponding to a link to a web page. Accordingly, it would be desirable to communicate information concerning the location and/or size of the active area for each frame without having to use a large signal bandwidth.

SUMMARY

A video signal is provided to a video system. In accordance with our invention, the location of one or more active areas associated with the video signal is communicated to the video system for some of the frames of the video signal, but not other frames of the video signal. The video system determines the location of the one or more active areas for the other frames by interpolation. In this way, instead of having to provide data to the video system concerning the active area locations for each frame, such data is provided only for selected frames, and the video system calculates where the active areas for the other frames should be by interpolating, e.g. using either a linear interpolation technique or a spline interpolation technique. Because the source of the video signal need not provide active area information for each frame of the signal, the bandwidth requirements for communicating this information are reduced.

In one embodiment, not only is the location of the active area communicated in this way, but the size of the active area is communicated in this way as well.

In accordance with another aspect of the invention, a video signal comprising a set of frames is communicated along with the location of an active area for some of the frames but not others of the frames. The active area corresponds to an object depicted in those frames. The object can be a product, a person, a cartoon character or anything else that can be depicted in a video. As mentioned above, the active area is not communicated for the others of the frames, although the object is depicted in the others of the frames. A receiving system calculates the location of the active area by interpolation based on the location of the location of the active area for said some of the frames. In this way, bandwidth requirements for communicating the location of the active areas is reduced.

BRIEF DESCRIPTION OF THE DRAWINGS

FIG. 1 illustrates a television showing an automobile race, with an active area of the screen highlighted.

FIG. 2 is a block diagram of a signal transmission system and a reception and display system in accordance with the invention.

FIG. 3 illustrates the position of the active area along the y axis vs the frame number of a video clip.

DETAILED DESCRIPTION

Referring to FIG. 2, a video transmission system 400 comprises a data mass storage device 406 including a portion 420 that stores a video program to be transmitted.

The video program can be any type of program—sporting event, soap opera, educational program, etc. Also included within mass storage device 406 is a portion 421 that contains annotation information. This annotation information includes a) the location of several active areas associated with various frames of the video program; b) the size of those active areas; and c) the link that those active areas are associated with. (The link can be in the form of a URL.) In other words, the annotation information might indicate that in a particular frame of the video program, there is a first active area located in the upper left portion of the video frame, and that active area has a certain size. If the viewer clicks on that active area, that should activate a link to a particular web page.

Mass storage device 406 can be any type of mass storage device, e.g. a magnetic disk, magnetic tape, optical or magnetic-optic media, or other data storage structure.

Information from mass storage device 406 is provided to a data separation circuit 405 that separates out the video signal and provides that video signal to a conventional transmitter 404. (Data separation circuit 405 is typically a server.) A television system 401 includes a receiver 411 for receiving the video signal. While FIG. 2 includes symbols indicating that the video signal is transmitted and received as conventional television radio signals, the video signal can be communicated by other means, e.g. electrical cable, optical cable, microwave, satellite communication, telephone lines, the internet, or other signal communication technique.

The annotation information (e.g. the location and size of the active area, along with the URL information associated with the active area) is communicated to television system 401 via a communication medium 403, which can be the same as, or different from, the medium by which the video signal is communicated. Thus, communication medium 403 can be conventional radio signals, an electrical cable, optical cable, microwave, satellite communication, telephone lines, the internet, or other signal communication technique:

Of importance, active area location information is not communicated for every single frame of the video signal. Instead, active area location information is only provided for certain frames of the video signal.

The annotation information is received by a preprocessing unit 412. Preprocessing unit 412 calculates, via an interpolation technique, the location of each active area of each frame for those frames in which that data was not provided by transmission system 400. In one embodiment, the interpolation technique is a linear interpolation technique. For example, suppose transmission system 400 provides the location for an active area every tenth frame. Also suppose, the active area "moves" about the video screen from frame to frame FIG. 3 illustrates the y coordinate values of the active area for frames 1, 10, 20 and 30, indicated by points 500, 501, 502 and 503, respectively. If a linear interpolation technique is used, it will be assumed that the y coordinate for the active area will be as established by lines 504, 505 and 506. Other interpolation techniques can be used, e.g. techniques that generate a curve instead of a straight line between specific points. For example, a spline interpolation technique can be used. If a spline interpolation technique is used, depending upon the spline calculation parameters, it will be assumed that the y coordinate for the active area will be along curve 507.

FIG. 3 illustrates the y coordinate of the active area vs. frame number. Similar calculations are performed for the x coordinate of the active area, and the size of the active area. (The size of the active area can increase or decrease, e.g. depending upon whether the object associated with the active area moves toward or away from the camera.)

Referring again to FIG. 2, it is seen that preprocessing unit 412 provides the video signal to a video display unit 414. Preprocessing unit 412 is coupled to a user interface. User interface 413 permits a user to control certain features of the image displayed on display unit 414, e.g. whether a marker will be shown on the screen indicating the location of the active area. User interface 41 3also permits a user to click on the various active areas to activate the links associated therewith.

User interface 413 typically has an appropriate control mechanism such as a trackball, mouse, touchpad or joystick. This interface is used to position a cursor on video display unit 414 so that the viewer knows what object he is clicking on. Preprocessing unit 412 determines whether the cursor has been positioned over an active area. In one embodiment, preprocessing unit 412 comprises a microprocessor system.

In our above-mentioned patent applications filed concurrently herewith, we describe a method wherein the active areas for selected frames are established, e.g. using a manual annotation system. The active areas are associated with objects depicted in the video frames. During this method, the location, size and shape of each active area is established for some (but not all) of the frames of the video clip. For the other frames of the video clip, the location and size of the active area is established by interpolating between the frames. In one embodiment, the location and size of the active areas for those frames that are manually annotated are communicated to video system 401. In other embodiments, the frames for which active area locations and sizes are communicated are selected on other bases. For example, the location and size of the active area can be communicated to receiving video system 401 for every tenth frame. Alternatively, the location and size of the active areas can be communicated only for the so-called "key frames" of the video clip. (Certain video compression algorithms communicate the entire pixel array only for certain key frames. For other frames, only information corresponding to the change between one frame and the next is communicated. The key frames are those frames for which the entire pixel array is communicated.)

Referring again to FIG. 2, in one embodiment a workstation 450 can be coupled to video transmission system 400. Workstation 450 comprises a personal computer ("PC") 451 and a local memory storage device 452 (e.g. a disk) or other non-local storage (e.g. a server) that contains editing software 453. Workstation 450 is used to annotate the video clip. In this example, workstation 450 is coupled Via a communication line 454 to server 405, but many other ways to network workstation 450 to server 405 can be used. In some embodiments, editor software 453 can run on server 405. In other embodiments, the files (both the video and annotation files) may reside on the local memory 452.

While the invention has been described with respect to specific embodiments, those'skilled in the art will recognize that changes can be made in form and detail without departing from the spirit and scope of the invention. For example, both the annotation information and video signal are shown as being sent as separate signals to receiving system 401, in some embodiments, the annotation information and video signal are communicated as a combined signal. This combined signal can be provided by transmitter 404 via broadcast medium 402. Alternatively, the combined signal can be provided via any of the above-mentioned communications media, e.g. optical or, electrical cable, microwave transmission, satellite transmission, etc. The video display unit 414 can employ any appropriate display technology, e.g. a projection video system, a CRT, LCD or other technology. Accordingly, all such changes come within the invention.

We claim:

1. A method comprising:

receiving a video image from a video image source, wherein said receiving is performed at a location remote from said video image source;

displaying said video image as a sequence of frames on a display device, wherein said display device is at said location remote from the location of said video image source;

receiving at said location remote from the location of said video image source information corresponding to the location of at least one active area for some of said frames but not others of said frames, wherein said location remote from the location of said video image source is also remote from the source of said information corresponding to the location of at least one active area; and determining at said location remote from the location of said video image source the location of said active area for said others of said frames by interpolation.

2. Method of claim 1 wherein said step of determining is performed by linear interpolation.

3. Method of claim 1 wherein said step of determining is performed by spline interpolation.

4. Method of claim 1 wherein information corresponding to the size of said active area is received for said some of said frames but not said others of said frames, said method also comprising determining the size of said active area for said others of said frames by interpolation.

5. Method of claim 1 wherein said active area is associated with a link, said method further comprising the step of activating said link.

6. Method of claim 1 wherein said link is a link to an internet page.

7. Method of claim 1 further comprising the act of activating said link.

8. Method of claim 7 wherein said act displaying comprises displaying said video on a display screen and said act of activating comprises the act of clicking on an active area on said display screen.

9. Method of claim 1 wherein said receiving said video image comprises receiving a broadcast video image, said displaying is performed by an end user video system, and said determining is performed by said end user video system.

10. Method of claim 9 wherein said information corresponding to the location of at least one active area for some of said frames but not others of said frames is broadcast, and said receiving of said information corresponding to the location of at least one active area for some of said frames but not others of said frames comprises receiving said broadcast.

11. Method comprising:

communicating from a first location to a second location remote from said first location a video clip comprising a set of video frames, some of the video frames within said set of video frames being annotated such that an active area is established for said some of said video frames;

communicating from said first location to said second location the location of said active area for said some of the video frames within said set of video frames and not others of said video frames within said set of video frames;

receiving said video clip and the location of said active area for some of said video frames within said set of video frames and not said others of said video frames, said receiving being accomplished at said second location; and establishing positions for said active area within said others of said video frames by interpolation, said establishing being accomplished at said second location.

12. Method of claim 11 wherein said video clip is communicated from said first location to said second location through a first communication medium and said location of said active area is communicated from said first location to said second location through a second communication medium that is different from said first communication medium.

13. Method of claim 11 wherein said active area is associated with an object, said object being shown in each of said video frames within said set of video frames.

14. Method of claim 11 wherein said communicating said video clip comprises broadcasting said video clip, and said communicating the location of said active area for said some of said video frames within said set of video frames but not others of said video frames within said set of video frames comprises broadcasting said location of said active area for said some of said video frames within said set of video frames but not others of said video frames within said set of video frames.

15. Method of claim 11 wherein said communicating said video clip comprises communicating said video clip to an end user, and said communicating of the location of said active area for some of said video frames within said set of video frames and not others of said video frames comprises communicating the location of said active area for some of said video frames within said set of video frames and not others of said video frames to an end user.

16. A system comprising:

a receiver for receiving a video signal from a video signal source;

a display coupled to said receiver for displaying a video image corresponding to said video signal, said video image comprising a set of frames; and a circuit receiving information indicating the position of at least one active area for some of said frames and not others of said frames, said circuit determining the location of said active area for said others of said frames by interpolation based on the location of said active area for said some of said frames, wherein said receiver, display and circuit are remote from said video signal source and the source of said information.

17. System of claim 16 further comprising a transmission system for transmitting from said video signal source to the location of said receiver, display and circuit said video signal and said information corresponding to the position of at least one active area for said some of said frames and not said others of said frames.

18. System of claim 16 wherein said receiver receives a video broadcast and the information received by said circuit receiving information is broadcast.

19. System of claim 16 wherein said system is an end user system.

20. Apparatus comprising:

a memory storage device storing a video signal, said video signal comprising a set of frames;

a memory storage device storing the location of an active area for some of said frames but not others of said frames;

a transmitter for transmitting said video signal and said location of said active area for said some of said frames but not said others of said frames, whereby a system remote from said transmitter receiving said video signal and said location of said active area for said some of said frames via said transmitter can establish a location for said active area for said others of said frames by interpolation.

21. Apparatus of claim 20 wherein said transmitter broadcasts said video signal and said location of said active area for said some of said frames but not others of said frames.

22. Apparatus of claim 20 wherein said system remote from said apparatus is an end user system.

23. Apparatus comprising:

a memory storing a video clip;

a structure for establishing the location of an active area for some of the frames of the video clip but not other frames of the video clip;

a transmission system for transmitting to a remote receiver the video clip and the location of the active area for said some of said frames of the video clip but not the other frames of the video clip; and a receiving unit for receiving and displaying the video clip and establishing the location of said active area for said other frames by interpolation.

24. Apparatus of claim 23 wherein said transmission system broadcasts said video signal and said location of said active area for said some of said frames but not others of said frames.

25. System of claim 23 wherein said transmission system transmits to an end user.

26. A method comprising:

receiving a video image at a first location;

displaying said video image as a sequence of frames on a display device at said first location;

receiving information corresponding to the location of at least one active area for some of said frames but not others of said frames at said first location, wherein said first location is remote from the source of said information; and determining at said first location the location of said active area for said others of said frames by interpolation.

27. Method comprising:

communicating to a first location a video clip comprising a set of video frames; and communicating from a second location to said first location the location of an active area for said some of the video frames within said set of video frames and not others of said video frames within said set of video frames, said second location being remote from said first location;

wherein said communicating is accomplished such that the active area for said others of said video frames are established by interpolation at said first location.

28. A system comprising:

a receiver for receiving a video signal from a video signal source;

a display coupled to said receiver for displaying a video image corresponding to said video signal, said video image comprising a set of frames;

a circuit receiving information indicating the position of at least one active area for some of said frames and not others of said frames, said circuit determining the location of said active area for said others of said frames by interpolation based on the location of said active area for said some of said frames, wherein said receiver, display and circuit are remote from the source of said information.

29. Apparatus comprising:

a memory storage device storing a video signal, said video signal corresponding to a set of frames;

a memory storage device storing the location of an active area for some of said frames but not others of said frames;

a transmitter for transmitting said video signal; and a transmitter for transmitting said location of said active area for said some of said frames but not said others of said frames, whereby a system remote from said transmitter receiving said video signal and said location of said active area for said some of said frames can establish a location for said active area for said others of said frames by interpolation.

30. Apparatus of claim 29 wherein said transmitter for transmitting said location of said active area transmits said location by a radio signal, an electrical cable, an optical cable, microwave, satellite, telephone lines or the internet.

31. Apparatus of claim 29 wherein said memory device for storing a video signal comprises a first portion of a data mass storage device and the memory device for storing the location of said active area for some of said frames but not others of said frames is a second portion of said data mass storage device.

* * * * *